United States Patent [19]

Smith et al.

[11] Patent Number: 5,766,745

[45] Date of Patent: Jun. 16, 1998

[54] FIRE BLOCKING TEXTILE INSULATION

[76] Inventors: W. Novis Smith, 412 S. Perth St., Philadelphia, Pa. 19147; Toby Burnham, 1480 Pumphrey Ave., Auburn, Ala. 36830

[21] Appl. No.: 599,623

[22] Filed: Feb. 9, 1996

[51] Int. Cl.$^6$ .............................. B32B 7/08; B32B 27/02
[52] U.S. Cl. ................... 428/218; 442/381; 442/388; 442/392; 442/402; 442/414; 442/415
[58] Field of Search ....................... 428/120, 408, 428/286, 287, 284, 218; 442/381, 388, 392, 402, 414, 415

[56] References Cited

U.S. PATENT DOCUMENTS

| | | | |
|---|---|---|---|
| 4,847,140 | 7/1989 | Jaskowski | 428/220 |
| 4,980,233 | 12/1990 | McCullough, Jr. et al. | 428/411.1 |
| 5,407,739 | 4/1995 | McCullough et al. | 428/287 |

OTHER PUBLICATIONS

New Riverside University Dictionary, 1984 by Houghton Mifflin Company, p. 229.

*Primary Examiner*—Kathleen Choi
*Attorney, Agent, or Firm*—John Lezdey & Associates

[57] ABSTRACT

The present invention teaches a textile structure and method of making thereof which is useful for fire blocking a structure and insulating it from sound and heat. The textile structure includes at least one composite having three layers which are placed upon one another to form top, middle and bottom layers. The middle layer is a densified matt or batting having at least 10% by weight of carbonaceous fibers. The top and bottom layers are less densified matts or battings which have at least 10% by weight of carbonaceous fibers. Multiple composites may be secured together for increased protection against fire, sound and heat.

17 Claims, 2 Drawing Sheets

FIRE BLOCKING TEXTILE INSULATION

BACKGROUND OF THE INVENTION

1. Field of the Invention

The present invention relates to fire blocking textiles. More particularly, the invention refers to nonwoven textile insulation for retarding and blocking fire while providing sound and heat insulation for a building structure or installation.

2. Description of the Prior Art

The prior art teaches lightweight fibrous structures that have a high degree of thermal insulation, are non-wetting and/or buoyant and have good fire resistance. It is known that a lightweight insulation can be made with hollow fibers of thermoplastic material, for example, styrenic fibers, intimately blended with other fibers and materials, such as carbonaceous polymeric fibers, which can provide synergistic ignition and fire resistance.

It is desirous to have lightweight structures that have a high degree of thermal insulation that can be washed and dried without retention of a great amount of water. For example, fiberglass containing structures are presently being used to provide fiber battings for use in insulating spaces in buildings and airplanes. In addition, fiberglass battings are being used as insulation in industrial apparel, blankets and curtains.

Disadvantages of fiberglass are plentiful. It is difficult to handle and can cause dermal irritation. The glass fibers are self-abrasive and quickly deteriorate when rubbed against itself. Moreover, the glass fibers are also brittle and tend to break, during processing. Finally, fiberglass does not have a high insulation compact value and can pick up moisture so as to cause it to increase in weight and to settle down after installation, which results in a loss in insulation value.

Polyester fibers are well-known, low in cost, non-irritating, have good insulation values and can be blended with other fibers utilizing conventional processes. However, a major disadvantage of polyester fibers is that they are highly flammable. Hollow polyester fibers are even more flammable because they provide a greater surface area for combustion. Fibers can also be prepared from other thermoplastic materials which have better fire resistant characteristics than polyester. However, the fire resistance of these thermoplastic materials also decreases when formulated into hollow fibers. It is also known that carbonaceous fibers can provide a synergistic improvement in fire resistance when blended with flammable materials.

It is also desirous to have a non-flammable thermal insulation material having a high degree of thermal insulation quality at a low bulk density, which also possesses excellent sound attenuating and dampening properties, such as resilient shape reforming lightweight non-flammable structures of carbonaceous materials having low heat conductivity, excellent thermal insulation and/or sound absorbing properties. The structures are further characterized by having good shape and volume retention so they are stable to numerous compression and unloading cycles.

Advanced thermal protection materials have to meet demands for an acceptable environment. Smoke toxicity, outgassing, dust and other irritants are problems not only for humans, but also for equipment.

Current acoustical and thermal protection materials in aircraft passenger cabins cause major problems because most common thermoplastic materials are unacceptable since they are flammable and can generate toxic fumes. For application in spacecraft, satellites, and military aircraft, smoke generation or outgassing may contaminate optical surfaces or react chemically with machine components. These pollutants can be controlled in part by the selection of fibers, coatings and proper pre- or post- treatments to minimize outgassing. Most applications for advanced aircraft require quantitative limits for volatile materials. Highly crystalline, fully crosslinked or thermosetting polymeric materials have been used where relatively inert behavior is required. However, such materials are still flammable.

The prior art has used asbestos, glass wool, polyester and polypropylene fibers, carbon and graphite short straight staple felts, fowl down, and various foam materials such as polyurethane foam as thermal insulation for many applications. While asbestos, carbon and graphite felts and fiberglass are considered nonflammable, the other aforementioned thermal insulating materials are considered flammable. The bulk densities of some of the well known thermal insulating materials are in the range of 0.35 to 2 pounds per cubic foot (5.6–32.04 kg/M$^3$) for insulating materials useful at temperatures not exceeding 120 degrees Celsius to 2–5 plus pounds per cubic foot for the high temperature insulating materials. Even the "lightweight" insulating material disclosed by NASA, consisting of a ceramic blanket from which a carbonaceous material has been burned out, has a bulk density of about 2–6 pounds per cubic foot (32–96 kg/m$^3$). In addition, many of the thermal light- weight thermal insulation materials are blended fibers of spun and drawn, crimped, stapled, and synthetic polymeric microfibers having a diameter of from 3 to 12 microns, and synthetic polymeric stapled microfibers having a diameter of from 12 to 50 microns. However, the insulation material is not fireproof and does not provide good sound absorbing properties.

U.S. Pat. No. 4,167,604 to William E. Aldrich, which is herein incorporated by reference, discloses the use of crimped hollow polyester filaments in a blend with fowl down in the form of a multiple ply carded web which is treated with a thermosetting resin to form a batting having thermal insulating characteristics. The web, however, does not have fireproof characteristics and is not a good sound absorbent.

U.S. Pat. No. 4,321,154 to Fracois Ledru, which is herein incorporated by reference, relates to high temperature thermal insulation material comprising insulating mineral fibers and pyrolytic carbon. To make the insulation lightweight, an expanding agent or hollow particles such as microspheres are utilized.

U.S. Pat. No. 4,193,252 to Shepherd et al., which is herein incorporated by reference, discloses the preparation of partially carbonized, graphite and carbon fibers from rayon which have been knitted into a fabric assembly. When the fabric is deknitted, the partially carbonized and the carbonized fibers contain kinks. The fully carbonized or graphite fibers have kinks which are more permanent in nature.

U.S. Pat. Nos. 4,980,233 and 4,950,533, both to McCullough, Jr. et al., and which are incorporated herein by reference, relate to fire and flame retarding and blocking structures and fabrics which comprise non-flammable carbonaceous fibers alone or in combination with other staple fibers and/or a thermoplastic or thermosetting resin matrix which can be used in the present invention.

The prior art further teaches about aircraft flame barriers, skirts and scoops that have been generally constructed with fabrics comprising flame retarding high performance fibers such as Kelvar®, Nomex® and Kynol®. However, these prior art fabrics add a large amount of additional weight and still are not effective in preventing scorching of the materials if the flame accidentally contacts the fabric.

SUMMARY OF THE INVENTION

In accordance with the present invention, a nonwoven textile is provided for insulating a structure against heat and sound while also providing superior fire blocking protection. More particularly, there is provided an insulating and fire blocking textile structure comprising at least one composite having a top, a middle and a bottom layer. Each layer contains at least 10% by weight of carbonaceous fibers having a carbon content of less than 85% by weight. The middle layer comprises a first densified matt or batting. Each of the top and bottom layers consists of at least one matt or batting which is affixed to the middle layer. The middle layer has a density greater than the density of each of the top and bottom layers. The resulting composite has a density from about 0.2 lbs/ft$^3$ to 35.0 lbs/ft$^3$.

Advantageously, the layers are affixed to one another by tacking, needling, fire resistant adhesive bonding, thermal fiber bonding or hot melt bonding. Preferably, the fire resistant adhesive is applied to the composite fabric until a selected density and thickness is accomplished. Normally, the fire resistant adhesive amounts up to about 20% by weight of the composite.

In other preferable embodiments of the present invention, a thicker product is provided by building up layers of composites one on top of each other. Finally, a method of making an insulating and fire blocking nonwoven textile is also taught by this invention.

It is an object of this invention to provide a non-flammable lightweight textile.

It is a further object of this invention to provide a textile capable of fire blocking a structure.

It is still another object of this invention to provide a textile having sound and thermal insulating properties.

It is yet still another object of this invention to provide a lightweight textile capable of insulating and fire blocking a military structure such as a vessel, tank, airplane or spacecraft.

Other objects and advantages will become more apparent from the following detailed description of the preferred embodiments and the accompanying drawings.

DESCRIPTION OF THE PREFERRED EMBODIMENTS

Figure 1:
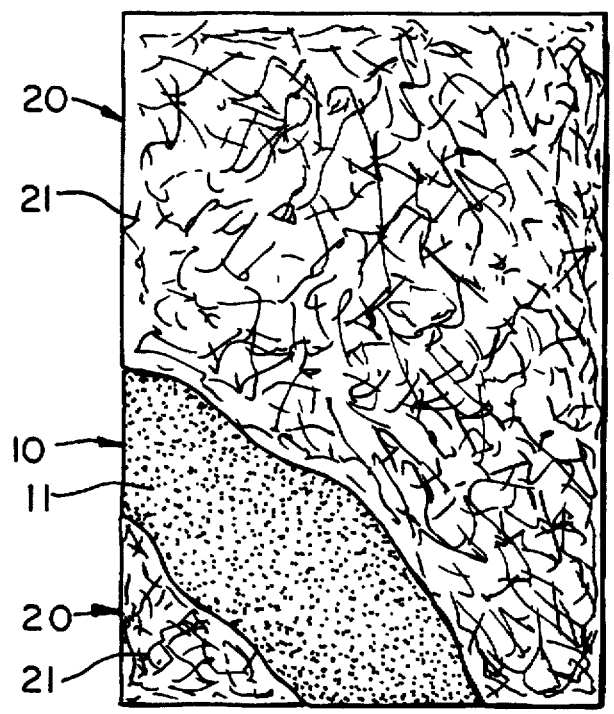
FIG. 1 is a top view of a three layered textile structure of the present invention with cut out portions exposing each layer.

Referring more particularly to the drawings, FIG. 1 shows a top view of a three-layered composite of the textile structure with a portion of each layer 10,20,20' being cut out. Each layer 10,20,20' contains at least 10% by weight of carbonaceous fibers which have a carbon content of less than 85% by weight. The middle layer 10 comprises a first densified matt or batting. Preferably, the middle layer 10 contains continuous or chopped fibers and has a density of between 1.0 lbs/ft$^3$ and 35.0 lbs/ft$^3$. The areal weight for the middle layer 10 should be at least 2 oz/yd$^2$.

The top and bottom layers 20,20'each comprise a matt or batting which may be of the same or similar type so long as they are less densified than the middle layer. Advantageously, the top and bottom layers 20,20'contain non-woven random order fibers 21 which have a density that is between 0.2 lbs/ft$^3$ and 3.0 lbs/ft$^3$ and is less than the density of the middle layer. The areal weight for each of these layers 20,20'should be at least 1 oz/yd$^2$. The fibers 21 may be linear, non-linear or a mixture of both.

Affixing the layers 10,20,20' together produces a composite having a density from about 0.25 lbs/ft$^3$ to 35.0 lbs/ft$^3$. This textile surprisingly gives superior fire retarding properties while also providing heat and sound insulation. None of the prior art has taught or suggested such a combination. Less dense composites are used where sound and heat absorption properties are paramount, while higher density composites are employed for maximum fire blocking protection.

Figure 2:
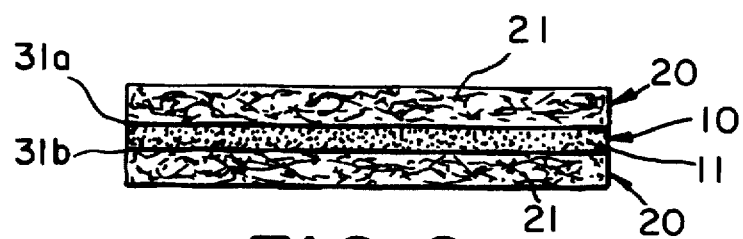
FIG. 2 is a side view of the three-layered textile structure of FIG. 1.

FIG. 2 shows a side view of the composite of FIG. 1. The fabric layers 10,20,20' are fixedly attached to one another by a variety of means including tacking or needling them together at the interface 31a,31b of each layer 10,20,20'. Alternatively, they may be bonded together with a fire resistant adhesive, thermal bondable fiber or a hot melt adhesive. Moreover, the thermal bondable fibers may be advantageously derived from nitrogen based fibers such as aromatic polyamides and polybenzimidazole. The middle layer 10 of the composite contains continuous or chopped fibers, while each of the top and bottom layers of the composite contains non-woven random order fibers 21. The areal weight of the composite is at least 4 oz/yd$^2$, which is simply the linear addition of the minimum areal weights of the three layers 10,20,20' (2 oz/yd$^2$ plus 1 oz/yd$^2$ plus 1 oz/yd$^2$).

According to one embodiment of the present invention, a second densified matt or batting is affixed to the top or bottom layers. Like the first densified matt or batting, the second densified matt or batting contains at least 10% by weight of carbonaceous fibers having a carbon content of less than 85% by weight and has comparable densities and areal weights.

According to another embodiment of the invention the textile structure taught by the present invention is formed by applying a fire resistant adhesive to hold the composite layers together. The adhesive may be liquid or solid, or fiber or sheet and is applied by conventional methods such as spraying or rolling etc. While any amount of adhesive that is effective is sufficient, preferably, the adhesive amounts up to about 20 percent by weight of the composite or less. Most preferably, the adhesive amounts to about 12 percent by weight of the composite. It has been found advantageous to use a silicate based adhesive, preferably an alkali metal silicate, and most preferably, a sodium silicate. The present invention contemplates use of other conventional adhesives so long as they are fire resistant and do not impair the fire resistance of the textile. Preferably, the adhesive acts in synergy with the layers to increase fire retarding characteristics of the textile.

The carbonaceous fibers utilized in the present invention usually have a carbon content by weight of greater than 65% and less than 85%. These fibers are essentially non-graphitic and are nonconductive.

In another form or example, advantageously, the middle layer contains electrically conductive fibers. The highly conductive fibers have resistances that are less than $10^4$ ohms per inch and are useful in applications where electrical grounding or shielding is also desired. It is understood that the greater the amount of chopped carbonaceous fibers which are utilized, the greater will be the shape reforming and fire retarding characteristics of the structure.

Preferably, the carbonaceous fibers are derived from a stabilized acrylic fiber such as acrylonitrile homopolymers, acrylonitrile copolymers and acrylonitrile terpolymers, wherein said copolymers and terpolymers contain at least 85 mole percent of acrylic units. Carbonaceous fibers which can be used in the invention are sold by R.K. Carbon Fibers, Inc. Philadelphia, Pa. under the trademarks CURLON® for non-linear fibers and LINEON® for linear fibers.

The carbonaceous fibers of the present invention when used to produce a fire blocking textile may be blended with other synthetic or natural fibers. Generally, up to about 90% of other fibers can be used depending upon the final utilization of the product. Examples of other reinforcing and/or conductive fibers that may be used include other carbonaceous or carbon fibers, as well as fibers of cotton, wool, polyester, polyolefin, nylon, rayon, asbestos, glass, silica, silicon carbide, silicon nitride, boron nitride, boron, acrylic, tetrafluoroethylene, polyamide, aramid, ceramic, such as aluminum silicate, and oxide.

If sound and heat insulation are the prime objective of the project, each layer of the composite preferably contains from about 10% to 85% of the carbonaceous fibers. Advantageously, such a composite will have a density of about 0.2 lbs/ft$^3$ to 3.0 lbs/ft$^3$. Conversely, if fire blocking properties are the prime objective of the project, each layer of the composite preferably contains from about 80% to 100% of the carbonaceous fibers. This is because increasing the percentage of carbonaceous fibers increases the amount of fire protection provided. Preferably, the densified matt or batting is needled punched, tightly woven or pressed. Advantageously, such a composite will have a density of about 1.0 lbs/ft$^3$ to 35.0 lbs/ft$^3$.

The user of the present invention has flexibility in designing the characteristics of the nonwoven textile structure so that it is better suited for heat and/or sound insulation or fire blocking protection. The more layers that are applied, the better the insulation will be as heat and sound waves are trapped in between the layers. The user balances space and weight restrictions along with the characteristics desired before designing the textile structure. For example, a textile structure that maximizes all of the above mentioned characteristics would combine two or more composites. One composite would have layers containing from about 10% to 50% of the carbonaceous fibers, while a second composite would have denser layers containing from about 50% to 100% of the carbonaceous fibers. The resulting textile structure would give superior heat and sound insulation as well as outstanding fire blocking protection.

Where space is available, a higher degree of protection from fire, sound and heat can be accomplished by combining a multiplicity of the textile structures. In this embodiment, at least two textile structures are fixedly attached to each other so that the first fabric layer side of the first textile comes in contact with the second fabric layer side of the second textile. Advantageously, the two textile structures are set together by a securing means such as a second adhesive or a needled thread. The textile structures taught by this invention can be built up in the same manner as described above, always contacting the first fabric layer side of each textile structure with the second fabric layer side of the following textile structure such that the high density layers are always bordered by a low density layer and vice-versa. Depending on the protection desired, one can change the order and number of the layers if it is suitable to do the job.

The protection against fire, sound and heat is enhanced with an increase in the number of textile structures secured together. This comes at the cost, however, of having a heavier and bulkier product. Therefore, the number of textile structures which are secured together will depend upon the amount of protection desired balanced against the weight, size and cost restrictions inherent to each particular selected application.

A method of preparing an insulating and fire blocking textile is also taught by the present invention. The steps of this method are as follows:

(a) feeding a bottom layer onto a continuous fiber processing system, the bottom layer consisting of a matt or batting comprising at least 10% by weight of carbonaceous fibers;

(b) feeding a middle layer onto the system, the middle layer consisting of a densified matt or batting comprising at least 10% by weight of carbonaceous fibers;

(c) feeding a top layer onto the system, the top layer consisting of a matt or batting comprising at least 10% by weight of carbonaceous fibers; and (d) affixing the layers together to form a composite by tacking, needling, bonding with a fire resistant adhesive or bonding with a hot melt adhesive.

Normally, only light tacking and light needling is necessary to secure the layers together. Advantageously, the continuous fiber processing system is either a carded system or an airlay system. For example, the blend of carbonaceous fibers and other staple fibers may be formed into a carded web employing conventional carding equipment. The carding operation serves to uniformly blend the carbonaceous fibers and other staple fibers. The carded web will ordinarily have a thickness in the range of up to three (3) inches (75.0 cm), but may be built up in multiple plies to produce thicker webs if more protection is desired as described above. While any amount of adhesive that is effective is sufficient, the weight of adhesive on the textile structure is preferably up to about 20 percent by weight of the composite, and most preferably, about 12 percent. The adhesive may be any conventional adhesive, but preferably, it is fire resistant. Advantageously, the adhesive is either sodium silicate or other silicates.

As previously described, additional matts or battings may be fixedly attached to the composite such that the multiplicity of layers alternate between high and low density matts or battings. This is done advantageously by use of a second adhesive layer or a needled thread of carbonaceous fibers. Steps (a)–(d) in the method may also be continuously repeated in sequence until a predetermined density and thickness of the finished product is achieved. The finished product may be placed inside of a structure, for example, a plane, a house, or a ship, to provide thermal insulation, sound insulation and fire blocking protection.

Figure 3:
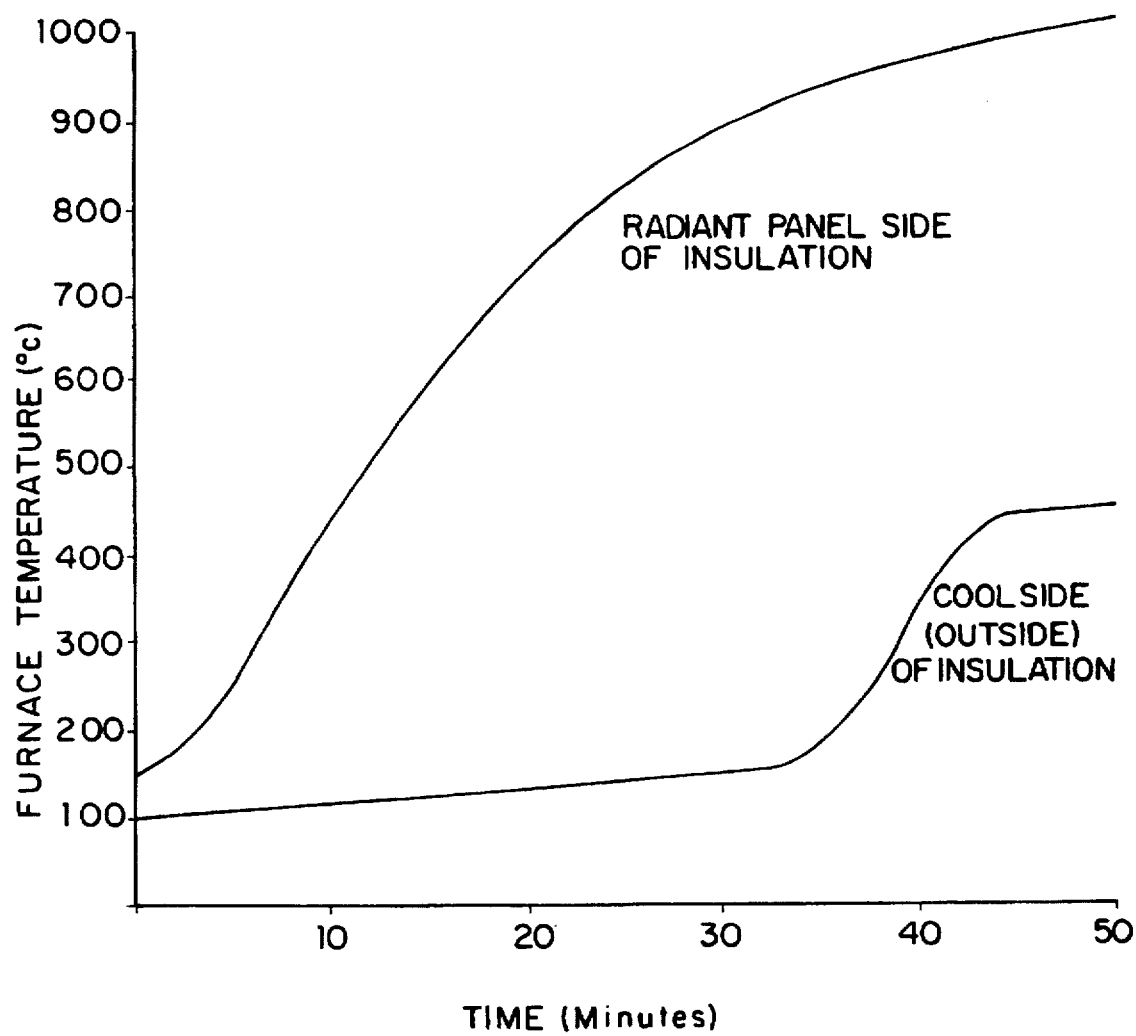
FIG. 3 is a graphical representation of the results of the Radiant Heat Panel Test.

One construction of the present invention preferably consists of four thin needled sheets which are relatively nonporous to air to block the convective hot air flow. These sheets can be separated by low density lightweight nonwoven areas in order to maintain the same overall density of insulation. A fire resistant adhesive is applied to hold the layers together. Applying a radiant heat panel test to this embodiment resulted in a 40%–50% increase in the breakthrough time at 450° F. A one (1) inch thick piece of this new construction insulation at essentially the same density gave a breakthrough time of 28–30 minutes compared to 19–20 minutes for the standard construction. A two (2) inch thick piece of this new construction insulation gave a breakthrough time of 42 minutes. FIG. 3 presents a graphical representation of the results of the radiant heat panel test measuring the furnace temperature against the time in minutes for breakthrough.

The test procedure for the radiant heat panel test can be described as follows:

EXAMPLE 1

Test Procedure For Radiant Heat Panel Test

A one (1) inch or two (2) inch thick piece of insulation of the invention measuring 36"×36" was inserted into a test rig at ambient or colder temperature. The radiant panel furnace was turned on and the temperature was allowed to rise. The temperature was recorded on the cold side of the test piece of insulation and plotted out as shown in FIG. 3. The time that it takes for the temperature to reach 450° F. was recorded.

Results For Radiant Heat Panel Test

Normal homogeneous insulation of Curlon® (non-linear, carbonaceous fiber, 8 or 9 micron diameter of R.K. Carbon Fibers, Inc.) breaks through in 19 minutes with one (1) inch thick insulation (about 5 lbs./ft$^3$ density). Two (2) inches of the same insulation requires 30 minutes before breakthrough. There is essentially little or no change when woven ceramic or glass facing is inserted into the body of the insulation while trying to keep the areal weights about the same.

Exemplary of the structure of the present invention is set forth in the following example:

EXAMPLE 2

Battings were made according to the present invention by blending an appropriate percentage of each respective opened fiber in a blender/feed section of a sample size 30 cm Rando Webber Model B (manufactured by Rando Machine Corp. of Macedon, N.Y.). The battings thus produced typically were about 2.5 cm thick and had a bulk density in the range of from about 0.4 lbs/ft$^3$ to 6.0 lbs/ft$^3$. The battings were thermally bonded by passing them on a conveyor belt through a thermal bonding oven at a temperature of about 400 degrees Fahrenheit. Then center damper needled for then rigid fabric. Flammability tests were run in a standard testing apparatus as cited in FTM 5903 according to the procedure of FAR 25.8536 9 which references FTM 59030. This textile structure is especially useful for insulation and fire blocking protection on the fuselage of an aircraft.

EXAMPLE 3

A textile structure having superior sound insulation properties was constructed as follows:
Top Layer: 0.40 lbs/cubic foot @ 1"
35% Sp-8 Curlon
25% Binary polyester
40% 4 dg polyester
Air layed and heat set in hot air oven @ 350° F.
Middle Layer: 2.6 ounces/yd.sq.
(Center Damper)
35% Sp-8 Curlon
25% Binary polyester
40% 4 dg polyester
(Thin rigid damper fabric)
Air layed, needle punch and heat set in hot air oven @ 350° F.
Bottom Layer: 0.40 lbs/cubic foot @ 1"
35% Sp-8 Curlon
25% Binary polyester
40% 4 dg polyester
Air layed and heat set in hot air oven @ 350° F.

The finished product had a density of about 1 lb/cubic foot. About 10% of a fire resistant adhesive is sprayed on to bind segments together. This product had the same sound absorption as a two inch section of current glass insulation. We conclude that the improved sound and acoustical insulation comes from the middle layer acting as a damper segment which deflects and/or absorbs sound waves.

While the invention as illustrated depicts an insulating and fire blocking textile, it is not limited to such. As various changes may be made in the form, arrangement and construction of parts of the preferred embodiments without departing from the spirit of the invention, it is understood that all matters herein are to be taken as illustrative and not in a limiting sense.

What is claimed is:

1. An insulating and fire blocking textile structure comprising at least a first composite having a top, a middle and a bottom layer, each layer comprising at least 10% by weight of carbonaceous fibers having a carbon content of less than 85% by weight, said middle layer comprising a first densified matt or batting, each of said top and bottom layers consisting of at least one matt or batting affixed to said middle layer, said middle layer having a density greater than the density of each of said top and bottom layers, and said composite having a density from about 0.2 lbs/ft$^3$ to 35.0 lbs/ft$^3$.

2. The textile structure according to claim 1, wherein said middle layer comprises a needle punched matt or batting.

3. The textile structure according to claim 1, further comprising a second densified matt or batting affixed to said top or bottom layers, said second densified matt or batting comprising at least 10% by weight of carbonaceous fibers having a carbon content of less than 85% by weight.

4. The textile structure according to claim 1, wherein said affixation of said layers comprises a method selected from the group consisting of tacking, needling, thermal bondable fibers adhesives, fire resistant adhesive bonding and hot melt bonding.

5. The textile structure according to claim 4, wherein said fire resistant adhesive is applied in an amount of up to 20% by weight of said composite.

6. The textile structure according to claim 4, wherein said fire resistant adhesive comprises about 12 percent by weight of said composite.

7. The textile structure according to claim 4, wherein said fire resistant adhesive comprises a sodium silicate.

8. The textile structure according to claim 3, further comprising a multiplicity of layers wherein the densities of each layer alternate between a high and a low density.

9. The textile structure according to claim 1, wherein said middle layer comprises electrically conductive fibers.

10. The textile structure according to claim 1, wherein said carbonaceous fibers are derived from stabilized acrylic fibers selected from the group consisting of acrylonitrile homopolymers, acrylonitrile copolymers and acrylonitrile terpolymers, and wherein said copolymers and terpolymers contain at least 85 mole percent of acrylic units.

11. The textile structure according to claim 4, wherein said thermal bondable fibers are derived from nitrogen based fibers selected from the group consisting of aromatic polyamides and polybenzimidazoles.

12. The textile structure according to claim 1, wherein each layer contains from about 10% to 85% by weight of said carbonaceous fibers.

13. The textile structure according to claim 12, wherein the density of said composite comprises from about 0.2 lbs/ft$^3$ to 3.0 lbs/ft$^3$.

14. The textile structure according to claim 1, wherein each layer contains from about 50% to 100% by weight of said carbonaceous fibers.

15. The textile structure according to claim 14, wherein the density of said composite comprises from about 1.0 lbs/ft$^3$ to 35.0 lbs/ft$^3$.

16. The textile structure according to claim 1, further comprising a second composite affixed to said first composite, wherein each layer of said first composite contains from about 10% to 50% by weight of said carbonaceous fibers and each layer of said second composite contains from about 50% to 100% by weight of said carbonaceous fibers.

17. The textile according to claim 1, wherein each layer comprises a blend of said carbonaceous fibers and fibers selected from the group consisting of glass, polyester and ceramic fibers.

* * * * *